Patented Aug. 26, 1924.

1,506,201

UNITED STATES PATENT OFFICE.

HENRY L. PRESTHOLDT, OF MINNEAPOLIS, MINNESOTA.

CASEIN GLUE.

No Drawing. Application filed April 17, 1922. Serial No. 554,193.

*To all whom it may concern:*

Be it known that I, HENRY L. PRESTHOLDT, a citizen of the United States, residing at Minneapolis, in the county of Hennepin and State of Minnesota, have invented certain new and useful Improvements in Casein Glues; and I do hereby declare the following to be a full, clear, and exact description of the invention, such as will enable others skilled in the art to which it appertains to make and use the same.

My present invention provides a new composition of matter, herein designated as "casein glue", but which, from its broader aspect, is an adhesive composition adapted to be used, by itself or commingled with other substances, as an adhesive coating.

In this improved adhesive composition, casein is used as an adhesive base and is commingled with calcium hydroxide (lime), sodium phosphate (an alkaline phosphate), sodium hyposulphite, (an acid sulphite of soda), calcium chloride and oil. The best results are obtained by using two oils, towit: castor oil and kerosene.

I have obtained a very highly efficient glue or adhesive by the use of the above noted substances in accordance with the following formula:

|  | Parts. |
| --- | --- |
| Casein | 50 to 75 |
| Calcium hydroxide | 10 to 20 |
| Sodium phosphate | 5 to 15 |
| Sodium hyposulphite | 2 to 8 |
| Calcium chloride | 2 to 5 |
| Castor oil | 1 to 4 |
| Kerosene | 2 to 7 |

The above noted substances, except the oils, are commingled in dry powdered form and the oils commingled therewith are in such small quantity that they do not make the powdered mass pasty but keep the same from getting into dust form. Moreover, when the kerosene and castor oil are introduced with the dry powder, they prevent the decomposition of the calcium hydroxide. The phosphate of soda and sodium hyposulphite produce or co-operate in producing a quality in the glue or adhesive substances adapting the same, when in an emulsion with water, to retain its fluidity and adhesiveness over a long period of time without going into a state known as "putrefaction".

This adhesive composition is sold in dry or powdered form and, when it is to be used, it will be introduced into water to form an emulsion, and it is then, of course, that the chemical reactions that develop the adhesive qualities of the composition, will take place. After these reactions have taken place, the emulsion is adapted to be used as a glue or as a coating to be used with other substances, such as paint or calcimine, which latter contain color pigments. When desired, however, the color-producing pigments may be commingled with the dry composition. When the composition is to be used simply as a glue, no additions to the formula given, except water, will be required.

Casein is the principal of which the colloids are formed. Calcium hydroxide unites with casein and forms calcium caseinate, imparting waterproof qualities to the glue. Sodium phosphate is a solvent, but alone, without the addition of sodium hyposulphite and calcium chloride, it is unable to perform the function of a solvent to the degree where the glue becomes sufficiently liquid. Sodium hyposulphite is introduced to neutralize and prevent the calcium hydroxide from staining the wood and, in addition, imparting a greater penetrating quality to the glue. The oils are incorporated for the purpose of preventing calcium hydroxide from forming calcium carbonate.

What I claim is:

1. An adhesive composition made substantially in accordance with the following formula:

|  | Parts. |
| --- | --- |
| Casein | 50 to 75 |
| Calcium hydroxide | 10 to 20 |
| Sodium phosphate | 5 to 15 |
| Sodium hyposulphite | 2 to 8 |
| Calcium chloride | 2 to 15 |
| An oil | 3 to 11 |

2. An adhesive composition made in accordance with the following formula:

|  | Parts. |
| --- | --- |
| Casein | 50 to 75 |
| Calcium hydroxide | 10 to 20 |
| Sodium phosphate | 5 to 15 |
| Sodium hyposulphite | 2 to 8 |
| Calcium chloride | 2 to 5 |
| Castor oil | 1 to 4 |
| Kerosene | 2 to 7 |

In testimony whereof I affix my signature.

HENRY L. PRESTHOLDT.